United States Patent [19]

Tucker

[11] Patent Number: 5,046,858

[45] Date of Patent: Sep. 10, 1991

[54] TEMPERATURE REFERENCE JUNCTION FOR A MULTICHANNEL TEMPERATURE SENSING SYSTEM

[75] Inventor: Roger L. R. Tucker, Farnborough, United Kingdom

[73] Assignee: Schlumberger Technologies Limited, Farnborough, England

[21] Appl. No.: 541,142

[22] Filed: Jun. 20, 1990

[30] Foreign Application Priority Data

Jun. 21, 1989 [GB] United Kingdom ............ 89 14244.2

[51] Int. Cl.$^5$ .............................................. G01K 7/00
[52] U.S. Cl. ................................... 374/179; 374/110; 374/129; 374/133; 374/166; 374/180; 374/181; 374/182; 364/557; 364/558; 136/211; 136/216; 136/228
[58] Field of Search ............... 374/179, 181, 182, 166, 374/208, 110, 129, 10, 11, 180, 171, 133; 364/557, 577; 136/211, 212, 228

[56] References Cited

U.S. PATENT DOCUMENTS

| | | | |
|---|---|---|---|
| 3,069,909 | 12/1962 | Hines | 374/182 |
| 3,648,523 | 3/1972 | Kemper et al. | 374/182 |
| 4,130,019 | 12/1978 | Nitschke | 374/181 |
| 4,147,061 | 4/1979 | Wester | 374/171 |
| 4,420,812 | 12/1983 | Ito et al. | 364/577 |
| 4,446,529 | 5/1984 | Strolle | 364/577 |
| 4,462,083 | 7/1984 | Schwefel | 364/577 |
| 4,483,631 | 11/1984 | Kydol | 374/179 |
| 4,624,582 | 11/1986 | Banda et al. | 374/181 |
| 4,883,364 | 11/1989 | Astheimer | 374/129 |

FOREIGN PATENT DOCUMENTS

| | | | |
|---|---|---|---|
| 0074433 | 6/1980 | Japan | 374/181 |
| 0169637 | 10/1982 | Japan | 374/179 |
| 0148930 | 9/1983 | Japan | 374/181 |
| 0970132 | 10/1982 | U.S.S.R. | 374/179 |

Primary Examiner—William A. Cuchlinski, Jr.
Assistant Examiner—V. Nguyen
Attorney, Agent, or Firm—Kinney & Lange

[57] ABSTRACT

A multi-channel remote-temperature-sensing system has a reference temperature assembly for the reference junctions of a plurality of temperature sensors for determining temperatures at remote points. The assembly comprises an array of components each adapted to make thermal contact with a reference junction of a remote-temperature-sensing thermocouple, an absolute reference thermometer situated within the array for measuring an absolute reference temperature, a thermocouple for sensing a temperature difference between the absolute reference thermometer and a component of the array, and data processing means for calculating the temperature of the component of the array from the absolute reference temperature and the temperature difference.

7 Claims, 1 Drawing Sheet

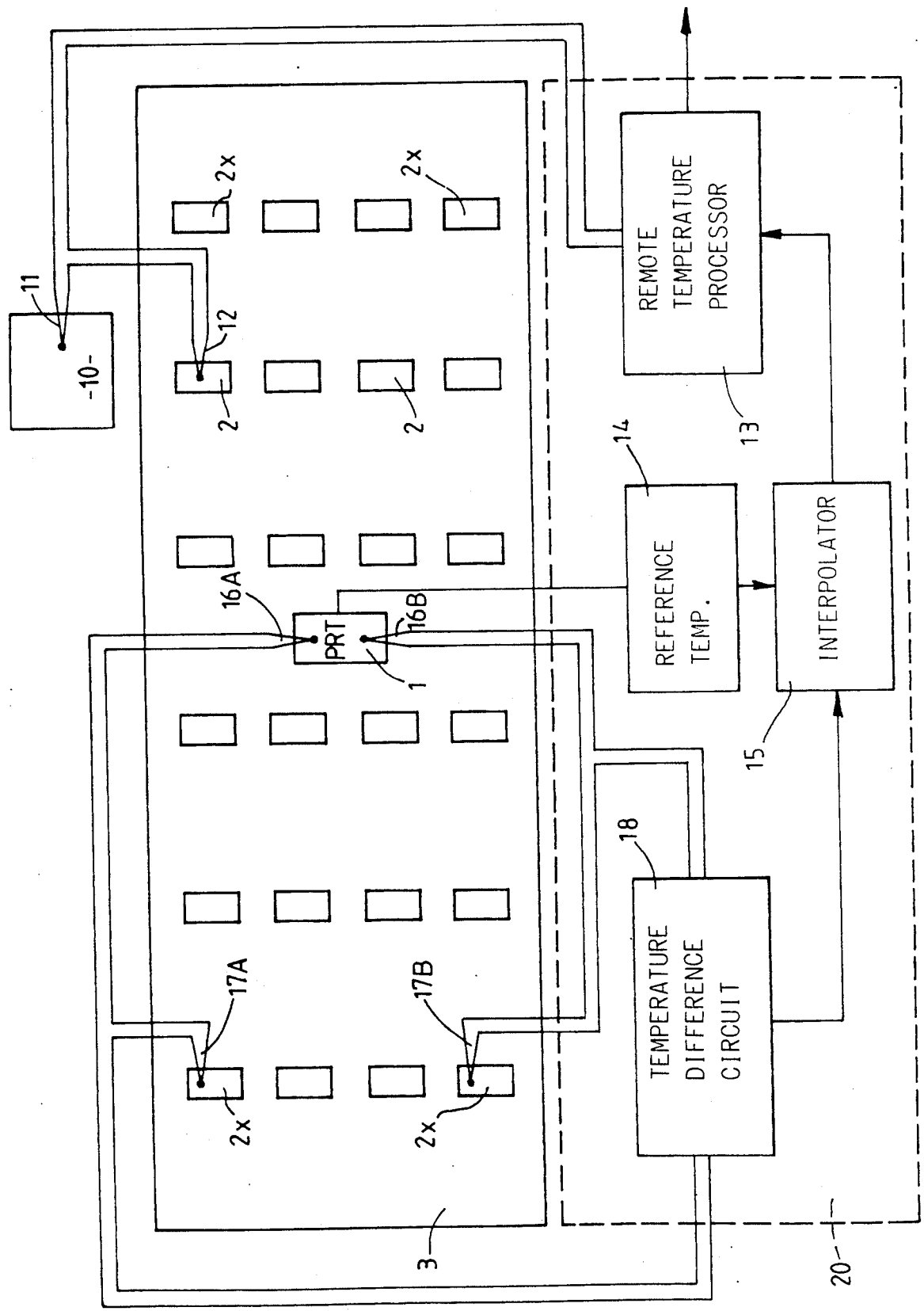

5,046,858

TEMPERATURE REFERENCE JUNCTION FOR A MULTICHANNEL TEMPERATURE SENSING SYSTEM

BACKGROUND OF THE INVENTION

This invention relates to a multichannel remote temperature sensing data system comprising a reference temperature assembly for a number of remote temperature sensors.

Thermocouples are commonly used as temperature sensors in combination with datalogging equipment in applications where a number of temperatures at a number of remote locations are to be measured and recorded by a central datalogger. An example of a multichannel remote temperature sensing data logger of this type is described in U.S. Pat. No. 4,147,061, which is hereby incorporated in its entirety in the present specification.

A thermocouple, once calibrated, can measure accurately the temperature difference $T_D$ between its two junctions, especially where that temperature difference is small. In practice, however, an absolute temperature measurement of the hot junction of the thermocouple at temperature $T_H$, is generally required. To this end, where a thermocouple terminates at a logger, its cold junction will be held at a reference temperature $T_C$ at the logger. $T_H$ is then known, being the sum of $T_C$ and $T_D$.

Any uncertainty in the measurement of $T_C$ will thus influence the accuracy of measurement of $T_H$. To obtain $T_C$ accurately in the highest performance dataloggers, platinum resistance thermometers (PRTs) are used to monitor the cold junction temperatures of each remote temperature sensing thermocouple. In a logging application, solid state electrical temperature sensors are clearly advantageous, and PRTs are used despite their high cost in preference to less costly thermocouples since they offer better accuracy. The best accuracy for thermocouples, to BS4937: part 20: 1983, is $</-0.5+/-0.004T$ °C., where T is the temperature in degrees Celsius. PRTs by contrast offer $+/-0.1°$ C. or better.

Thermocouples cannot therefore be used to monitor the absolute cold junction temperatures of sensing thermocouples if accuracy of 0.5° C. or better is required. In practice therefore, for the highest performance, each sensing thermocouple terminated in a datalogger has its cold junction temperature monitored continuously by a PRT. Since a logger may have 50 or more sensing thermocouples, this is very costly.

SUMMARY OF THE INVENTION

The invention provides a multichannel remote temperature sensing data system including a reference temperature assembly comprising an array of components each adapted to make thermal contact with a reference junction of a remote-temperature-sensing thermocouple, an absolute reference thermometer situated within the array for measuring an absolute reference temperature, a thermocouple for sensing a temperature difference between the absolute reference thermometer and a component of the array, and data processing means for calculating the temperature of the component of the array from the absolute reference temperature and the temperature difference.

The temperature reference assembly of the invention may only comprise a single absolute reference thermometer, which may be a platinum resistance thermometer, for a multichannel data system. This reference thermometer provides a more accurate absolute temperature measurement than would be possible with a thermocouple. Thermocouples are then used however to monitor small temperature variations between the reference thermometer and the array components, which may be terminal blocks adapted to receive the reference junctions of remote sensing thermocouples.

Since the array of components and reference junctions may be small in size to keep the temperature variations between them small, and since thermocouples can measure small temperature differences with good accuracy, very little error will result from the use of thermocouples to monitor these small variations instead of using a platinum resistance thermometer to measure the temperature of each sensing thermocouple reference junction as in the prior art. Performance in terms of accuracy may thus be maintained while cost is much reduced.

The invention further resides in the use of thermocouples to monitor only predetermined components of the array remote from the absolute reference thermometer, and the use of a data processor to interpolate the temperatures of components not directly measured.

This further reduces the complexity of the hardware required by reducing the number of thermocouples with little loss of accuracy.

If for example a rectangular array of 50 components were used, with a central platinum resistance thermometer and thermocouples monitoring only the temperature differences between the reference thermometer and the components at the four corners of the array, the complexity and cost of fitting and monitoring 46 thermocouples would be saved.

In each installation comprising a reference temperature assembly of the invention, each of the thermocouples used may initially be calibrated in order to increase accuracy in operation. In each installation long term accuracy would then be ensured despite normal environmental temperature fluctuations since the absolute reference thermometer, which may be a PRT, would monitor and correct for these environmental changes.

BRIEF DESCRIPTION OF THE DRAWING

FIG. 1 is a schematic plan view of a reference temperature assembly.

DETAILED DESCRIPTION OF THE PREFERRED EMBODIMENTS

In the embodiment, a multichannel remote temperature sensing datalogging system includes a reference temperature assembly comprising a platinum reference thermometer (PRT) 1 and twenty four terminal blocks 2 each adapted to make thermal contact with a reference junction of a remote sensing thermocouple. The PRT 1 is mounted centrally on a printed circuit board (PCB) 3 in the middle of a rectangular 6×4 array of terminal blocks 2 also mounted on the PCB 3. A set of four further thermocouples is provided to measure the temperature difference between the PRT 1 and the outermost terminal blocks 2X. Each terminal block 2 is a 3-way terminal block and forms a result channel termination point for a datalogger.

In addition each terminal block 2 provides a reference temperature for a remote sensing thermocouple. It is necessary therefore to know the temperature of each block as accurately as possible. The temperature of each block is determined as follows. The PRT 1 provides an accurate absolute temperature measurement at the centre of the PCB 3. There may however be temperature variations across the array of terminal blocks 2. Any such temperature variations are therefore monitored by the set of four thermocouples between the PRT 1 and the cornermost terminal blocks 2X. Since these temperature variations will be small they may be measured accurately by thermocouples, the reference temperature assembly being advantageously small in size and located in an enclosure so as to keep the temperature variations small.

The temperatures of the centre and of the four corners of the array of terminal blocks are thus accurately known. From this data, data processing circuitry within the datalogger interpolates the temperatures of all the terminal blocks 2 on the PCB 3. An absolute reference temperature for each remote sensing thermocouple is therefore accurately known although only one PRT 1 is used.

If increased accuracy is required it would be possible to employ more temperature sensors, either using more thermocouples to monitor the temperature differences between PRT 1 and further terminal blocks 2, or employing a second PRT located elsewhere in the array of terminal blocks 2. Either method may incur extra cost and complexity however.

The drawing shows by way of example a remote unit 10 whose temperature is to be logged. A hot junction 11 of a thermocouple is attached to the unit 10 and a cold junction 12 is attached to one of the terminal blocks 2. The ouput of the thermocouple is supplied to a remote temperature processor 13 which delivers an output signal representing the temperature at the remote unit 10. Each of the terminal blocks 2 is similarly associated with a remote temperature sensing thermocouple which is connected to the processor 13 but, for clarity, these have been omitted from the drawing.

The PRT 1 is connected to a referenced temperature unit 14 which supplies a temperature signal to an interpolator 15. Two of the temperature difference thermocouples are shown in he drawing, each of which has a junction 16A or 16B attached to the PRT and a junction 17A or 17B attached to one of the corner terminal blocks 2X. The temperature differences measured by these thermocouples (and those for the other two corners of the array) are fed to a temperature difference circuit 18 whose output is delivered to the interpolator 15. For each of the terminal blocks 2 the interpolator 15 determines a temperature value based on the reference temperature determined by the PRT and the differences between the reference temperature and the temperatures of the corner blocks 2X determined by the thermocouples feeding the circuit 18. These temperatures are fed sequentially to the processor 13 to enable the absolute value of the remote temperature at a location such as unit 10 to be calculated and output to a recording system.

The electronic circuits required to detect the outputs from the various temperature sensors and convert them into temperature measurements are shown schematically. In practice they could be implemented as a data processor 20 which would receive and process the various inputs in a convention fashion.

I claim:

1. A reference temperature assembly for a multichannel remote temperature sensing data system comprising an array of components each adapted to make thermal contact with a reference junction of a remote-temperature-sensing thermocouple, an absolute reference thermometer situated within the array for measuring an absolute reference temperature, a thermocouple for sensing a temperature difference between the absolute reference thermometer and a component of the array, and data processing means for calculating the temperature of the component of the array from the absolute reference temperature and the temperature difference.

2. A reference temperature assembly according to claim 1 in which the thermocouple measures the temperature difference between the absolute reference thermometer and a predetermined component of the array remote from the absolute reference thermometer and comprising data processing means for using the absolute reference temperature and the measured temperature difference to interpolate the temperature of a further component of the array.

3. A reference temperature assembly according to claim 1 in which the absolute reference thermometer is a platinum resistance thermometer.

4. A reference temperature assembly according to claim 1 in which the absolute reference thermometer is situated substantially centrally in the array of components.

5. A reference temperature assembly according to claim 1 in which the array of components is a rectangular array.

6. A reference temperature assembly according to claim 5 in which the thermocouple measures the temperature difference between the absolute resistance thermometer and a component at a corner of the array.

7. A reference temperature assembly according to claim 1 in which the components of the array are 3 way terminal blocks.

* * * * *